May 23, 1944.  R. N. LESNICK  2,349,630
AIRCRAFT COCKPIT CANOPY
Filed June 10, 1941  3 Sheets-Sheet 2
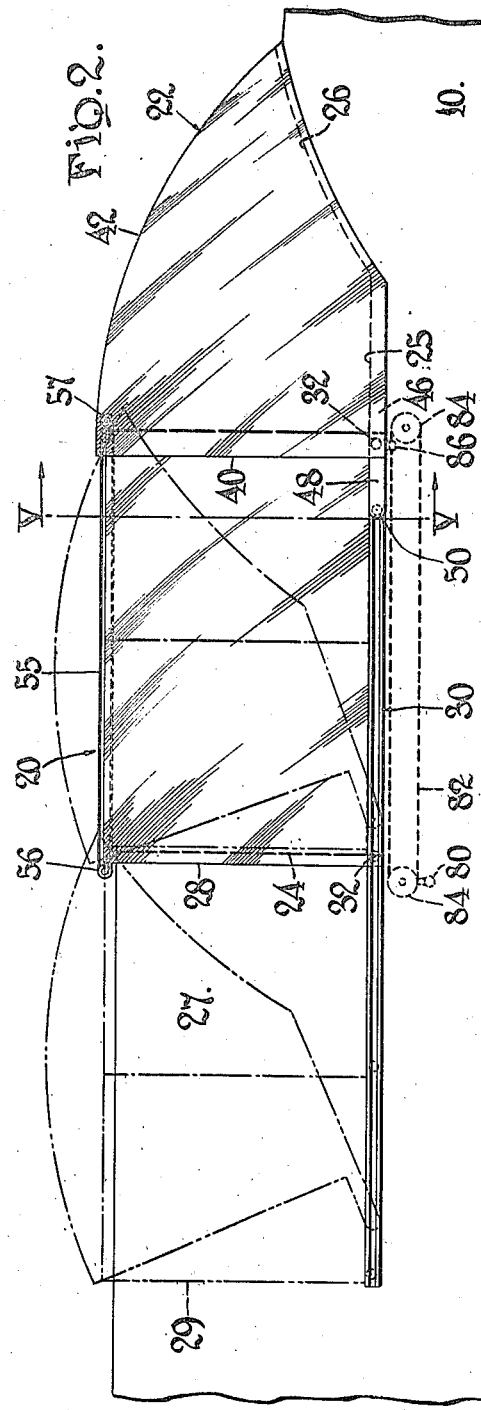
INVENTOR
Robert N. Lesnick,
BY
Beau, Brooks, Buckley & Beau.
ATTORNEYS

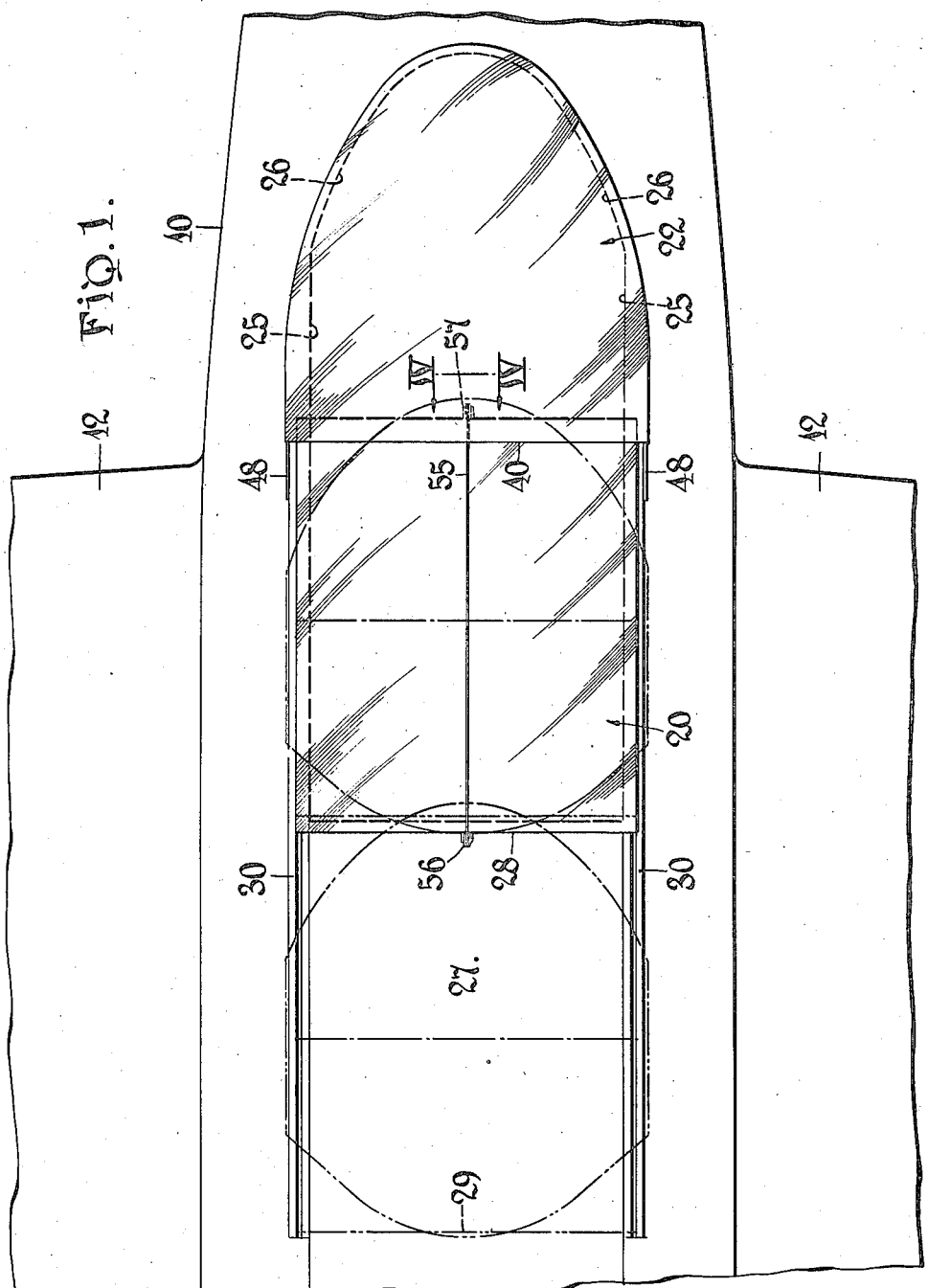

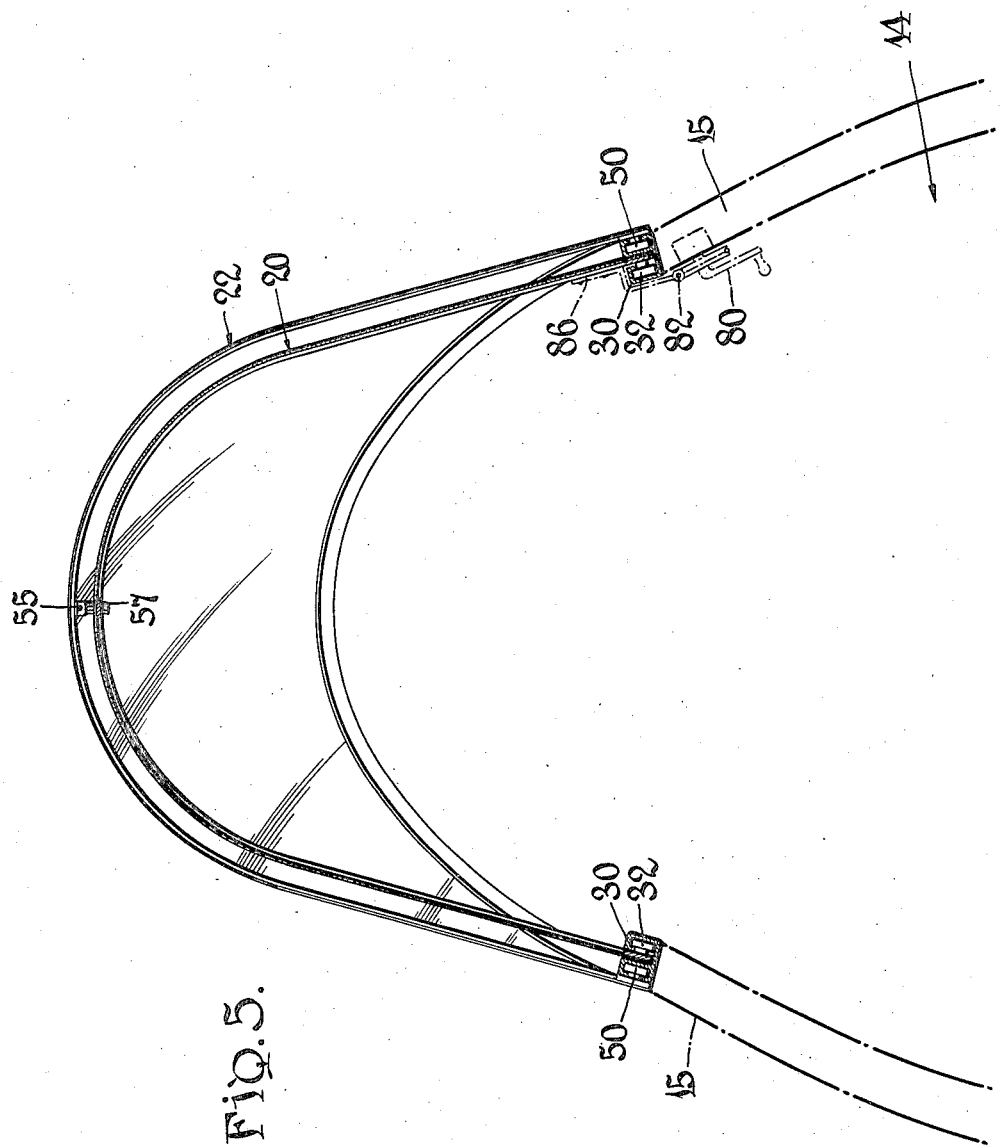

Patented May 23, 1944

2,349,630

UNITED STATES PATENT OFFICE 2,349,630

AIRCRAFT COCKPIT CANOPY

Robert N. Lesnick, Brooklyn, N. Y., assignor to Brewster Aeronautical Corporation, Long Island City, N. Y.

Application June 10, 1941, Serial No. 397,428

6 Claims. (Cl. 244—121)

This invention relates to aircraft cockpit canopies, and more particularly to an improved canopy for military aircraft, or the like, which is adapted to be actuated between open and closed positions during flight, in an improved manner. Other objects and advantages of the invention will appear in the specification hereinafter.

In the drawings:

Fig. 1 is a fragmentary plan of an airplane having a cockpit equipped with a canopy of the invention;

Fig. 2 is a fragmentary side elevation thereof;

Fig. 3 is a fragmentary longitudinal vertical section, on an enlarged scale, taken through an upper central portion of the canopy of Figs. 1 and 2;

Fig. 4 is a fragmentary section taken substantially along line IV—IV of Fig. 1; and Fig. 5 is a section, on an enlarged scale, taken substantially along line V—V of Fig. 2.

The invention is illustrated in the drawings in connection with an airplane having a fuselage designated generally at 10 and oppositely extending wing panels 12, and in which the fuselage 10 includes a cockpit or passenger compartment 14. The cockpit 14 is shown as being disposed longitudinally of the airplane fuselage aft of the position of the usual pilot cockpit thereof, thus to provide a rear gunner's compartment in a military airplane from which the occupant is enabled to fire rearwardly of the direction of airplane flight. Thus, the cockpit 14 is adapted to contain a flexibly mounted machine gun unit and gunner's seat (not shown); the gun unit being so arranged as to be adapted to be raised and lowered and otherwise adjusted in elevation and azimuth by the gunner for combat purposes. The cockpit covering canopy is provided to normally enclose the upper portion of the cockpit and is formed generally of transparent material mounted upon metal framework so that the gunner may view the surroundings of the airplane while being protected from the effects of the adjacent airstream. The canopy is also provided so as to be readily retractable at will by the gunner whereby the upper portion of the cockpit in the region of the gun unit may be uncovered to avoid interferences with maneuvering of the gun unit during combat.

The canopy of the invention is of multi-section form, and is illustrated as comprising a forward section 20 and a rear section 22 which are connected for movement in an improved manner relative to the fuselage 10 between cockpit-covering and uncovering positions. As illustrated herein, the canopy sections 20—22 are generally of inverted U-section form (Fig. 5) so as to extend upwardly from the top side wall portions 15 of the gunner compartment 14 and thereover to provide covering protection for the gunner at opposite sides of the cockpit and thereabove. The fuselage 10 is illustrated as being recessed adjacent the forward end of the cockpit 14, as indicated at 24 (Fig. 2), and as at 25 and 26 at intermediate and rear end portions of the cockpit 14. Thus, a stationary abutment portion 27 of the fuselage is disposed just forwardly of the cockpit 14. The sections 20—22 of the canopy are formed to provide a substantially streamlined shape in conjunction with the fuselage when the canopy is in cockpit enclosing position.

The canopy section 20 is mounted upon the fuselage 10 so as to overlap at its forward end the fuselage structure, as at 28; and the canopy section 20 is arranged for sliding movement longitudinally thereof away from the solid line position of Figs. 1 and 2 and forwardly so that its leading edge moves to the broken line position thereof as indicated at 29. For this purpose a pair of tracks 30 are anchored to the top side wall portions 15 of the fuselage to engage rollers 32 extending from the lower edge of the framing structure of the canopy section 20 for holding the canopy section 20 to the fuselage 10 and guiding the longitudinal sliding movements thereof forwardly from its solid line cockpit-covering position and into nested relation over and about the fixed fuselage portion 27, as illustrated by broken lines at the extreme left side of Fig. 2.

The canopy section 22 is formed at its forward end portion to normally overlap the rear end portion of the canopy section 20, as at 40, and the section 22 is crowned as at 42 to provide a smoothly curved enclosure for the rear end of the cockpit 14 for coverage of the cockpit and to provide visibility for the gunner in all directions laterally and rearwardly and upwardly therethrough. The lower marginal edge portion of the canopy section 22 is of course shaped to conform to the configuration of the adjacent fuselage wall formations at 25 and 26, and will be detachably locked to adjacent portions of the fuselage wall structure under canopy-closed conditions by any suitable latch means (not shown) as may be desired. Adjacent its lower front edge portions the canopy 22 is provided with rigid framing elements 46 arranged to extend therebeyond to provide cantilever arms 48 carrying rollers 50 at their outer ends. The rollers 50 are mounted within the corresponding track members 30 at opposite sides of the fuselage (Fig. 5), and thus the lower forward end portion of the canopy 22 is pivotally mounted upon the fuselage and arranged to be guided through displacement movements longitudinally of the airplane by the tracks 30.

The canopy sections 20—22 are connected at their upper central portions by means of an endless cable 55 which is trained about pulleys 56 and 57 mounted to extend by means of corresponding mounting brackets 58 and 59 from opposite end portions of the canopy section 20; the brackets being welded or otherwise attached to corresponding metal framing elements 60—61 into which the transparent panel portions 65 of the canopy are mounted (Fig. 3). The cable 55 is fixed to the adjacent stationary fuselage portion 27 by means of a bracket 67 and a connection 68, and the rear canopy section 22 is fixedly connected to the cable 55 by means of a bracket connection device 70 extending rigidly from a metal end framing element 72 upon which the transparent panel 74 of the canopy section 22 is mounted. It will be understood that the transparent panel sections 65 and 74 will be preferably lined with rubber or other resilient substance as at 76—77 in the regions of their mountings upon the metal framing elements of the canopy structures for weatherproofing of the joints and elimination of secondary stresses upon the transparent panels. Fig. 3 illustrates in detail the relative arrangement of the structural and operative parts of the cockpit control mechanism when in canopy-closing position.

Thus, it will be understood that upon movement of the canopy section 20 forwardly of the solid line cockpit-closing position thereof, the pulley 56 will force the upper strand of the cable 55 to pull the rear canopy section 22 forwardly at twice the rate of motion of the canopy section 20 relative to the airplane fuselage. Consequently, the rear canopy section 22 will be automatically caused to overrun the front canopy section 20 because of the pull of the cable 55 upon the uppermost portion of the canopy 22 whereby it is initially caused to pivot about the transverse axis of the rollers 50—50 until its rear end is lifted out of engagement with the adjacent fuselage structure. As the pull of the cable 55 upon the canopy 22 continues the canopy 22 is caused to slide up over the canopy section 20 in pick-a-back fashion, until such time as the canopy section 20 is disposed entirely forwardly of the cockpit opening and in nested relation over and about the fixed fuselage portion 27. At this time the canopy section 22 is also nested in pick-a-back fashion over the canopy section 20 as illustrated at the extreme left hand broken line views thereof in Figs. 1 and 2, and thus the cockpit 14 is entirely uncovered. The intermediate broken line positions of the canopy sections 20—22 show the relation of the sections when the forward section 20 is moved to approximately half way open position, at which time the section 22 has only partially overtaken the section 20. It will be understood that upon reverse movement of the canopy section 20 the section 22 will be reversely operated to automatically return the canopy parts to cockpit closing position.

To provide the actuating movements of the canopy sections 20—22 described hereinabove a manually operable crank 80 is mounted upon an inner wall of the cockpit 14 within convenient reach of the gunner, and is arranged to drive an endless chain 82 which is trained about fixed pulleys 84—84 and fixedly connected to an extending bracket portion 86 of the canopy section 20. Thus, upon manual rotation of the crank 80 the canopy section 20 may be caused to move in any desired direction, and the canopy section 22 will thereby be automatically correspondingly actuated as described hereinabove to provide the features and advantages of the invention. It will be understood that the crank 80 will preferably be of any suitable self-locking type whereby upon release thereof by the operator the crank device will automatically move in response to the action of a spring or the like into locked position. Thus, the canopy sections 20—22 will be automatically locked in any desired position of adjustment longitudinally of the airplane merely upon release of the crank 80 by the operator thereof. Or, if preferred, the crank 80 may be arranged to drive the canopy actuating gear through any suitable form of irreversible drive mechanism.

Thus, it will be understood that the invention contemplates provision of a cockpit covering canopy of multi-sectional form, the sections of which are adapted to move relative to one another in telescoping fashion upon application of movement producing forces to one of the sections, for cockpit uncovering purposes. It will be understood that, if preferred, the more rapidly moving section or sections of the canopy may be disposed to ride under the more slowly moving section or sections thereof in lieu of the overrunning or pick-a-back arrangement illustrated and described hereinabove. It will also be understood that in lieu of the specific cable and pulley form of connection device between adjacent sections of the canopy as illustrated in Fig. 3, any other suitable form of power transmitting connection device may be employed thereat, such as a gear and opposed rack arrangement, or a system of links and levers, or the like, whereby movement of one of the canopy sections will be automatically accompanied by movement of the other canopy section or sections at different rates of motion to procure the telescopic movement described hereinabove.

I claim:

1. In an aircraft having a passenger carrying body portion cut away to provide a cockpit opening, a canopy adapted to function as a closure for said cockpit opening and comprising a plurality of canopy sections mounted upon track means extending from said body portion for guiding displacement of said canopy sections between cockpit-covering and uncovering positions, means for imparting controlled movement to one of said canopy sections upon said track means, horizontal pivot means mounting the other canopy section for limited pivotal movement fore and aft, and means connecting said canopy sections whereby movement of the one canopy section on said track means pivots the other of said canopy sections relative to said body section and upon said track means in response to movement of said first mentioned canopy section so as to be nested therewith in cockpit-uncovered position, said connecting means including differential drive means whereby the rate of movement of each canopy section is substantially proportionate to the distance between its cockpit-covering and uncovering positions.

2. In an aircraft, a cockpit, a canopy enclosure for said cockpit comprising a plurality of canopy sections mounted upon the aircraft for displacement between cockpit-covering and uncovering positions, one of said sections being mounted for pivotal and longitudinal sliding movement, said canopy sections being connected by differential drive means operable to automatically cause the one of said sections to be pivoted into alignment with and moved in pick-a-back relation to the other of said sections by and simultaneously with movement of the other of said sections toward cockpit uncovering position.

3. In an aircraft having a passenger carrying body portion cut away to provide a cockpit opening, a canopy adapted to function as a closure for said cockpit opening and comprising a plurality of canopy sections mounted upon track means extending from said body portion for guiding displacement of said canopy sections between cockpit-covering and uncovering positions, self-locking manual drive means for providing controlled movement of one of said canopy sections upon said track means, horizontal pivot means mounting the other canopy section for limited pivotal movement fore and aft, and means connecting said canopy sections whereby movement of the one canopy section on said track means pivots the other of said canopy sections relative to said body section and subsequently moves said other section upon said track means in response to further movement of said first mentioned canopy section.

4. In an aircraft having a passenger carrying body portion cut away to provide a cockpit opening, a canopy adapted to function as a closure for said cockpit opening and comprising a plurality of canopy sections mounted upon track means extending from said body portion for guiding displacement of said canopy sections between cockpit-covering and uncovering positions, drive means for imparting controlled movement to one of said canopy sections upon said track means, horizontal pivot means mounting the other canopy section for limited pivotal movement fore and aft, and means connecting said canopy sections whereby movement of the one canopy section on said track means pivots the other of said canopy sections relative to said body section and upon said track means in response to movement of said first mentioned canopy section so as to be nested therewith in cockpit-uncovered position, said connecting means including differential drive means whereby movement of the one canopy section imparts a more rapid movement to the other canopy section.

5. In an aircraft having a passenger carrying body portion cut away to provide a cockpit opening, a canopy adapted to function as a closure for said cockpit opening and comprising a plurality of canopy sections mounted upon track means extending from said body portion for guiding displacement of said canopy sections between cockpit-covering and uncovering positions, means for providing controlled movement of one of said canopy sections upon said track means, horizontal pivot means mounting the other canopy section for limited pivotal movement fore and aft, and means connecting said canopy sections whereby movement of the one canopy section on said track means pivots the other of said canopy sections relative to said body section and subsequently moves said other section upon said track means in response to further movement of said first mentioned canopy section.

6. In an aircraft having a passenger carrying body portion cut away to provide a cockpit opening, a canopy adapted to function as a closure for said cockpit opening and comprising a plurality of canopy sections mounted upon track means extending from said body portion for guiding displacement of said canopy sections between cockpit-covering and uncovering positions, self-locking means for imparting controlled movement to one of said canopy sections upon said track means, horizontal pivot means mounting the other canopy section for limited pivotal movement fore and aft, and means connecting said canopy sections whereby movement of the one canopy section on said track means pivots the other of said canopy sections relative to said body section and upon said track means in response to movement of said first mentioned canopy section so as to be nested therewith in cockpit-uncovered position, said connecting means including differential drive means whereby movement of the one canopy section imparts a more rapid movement to the other canopy section.

ROBERT N. LESNICK.